A. F. PRIEST.
VEHICLE WHEEL.
APPLICATION FILED NOV. 18, 1911.

1,086,786.

Patented Feb. 10, 1914.
3 SHEETS—SHEET 1.

Witnesses:

Inventor:
Augustus F. Priest,
By Dyrenforth, Lee, Chritton and Wiles,
Attys.

A. F. PRIEST.
VEHICLE WHEEL.
APPLICATION FILED NOV. 18, 1911.

1,086,786.

Patented Feb. 10, 1914.
3 SHEETS—SHEET 2.

Witnesses:

Inventor:
Augustus F. Priest,
By Dyrenforth, Lee, Chritton and Wiles,
Attys.

A. F. PRIEST.
VEHICLE WHEEL.
APPLICATION FILED NOV. 18, 1911.

1,086,786.

Patented Feb. 10, 1914.
3 SHEETS—SHEET 3.

UNITED STATES PATENT OFFICE.

AUGUSTUS F. PRIEST, OF AKRON, OHIO.

VEHICLE-WHEEL.

1,086,786. Specification of Letters Patent. Patented Feb. 10, 1914.

Application filed November 18, 1911. Serial No. 661,050.

*To all whom it may concern:*

Be it known that I, AUGUSTUS F. PRIEST, a citizen of the United States, residing at Akron, in the county of Summit and State of Ohio, have invented a new and useful Improvement in Vehicle-Wheels, of which the following is a specification.

My invention relates particularly to vehicle-wheels of the variety in which the hub is yieldingly supported on the rim of the wheel through the medium of springs; and my object is to provide a simple, durable, and relatively light construction of wheel of this variety which shall be economical of manufacture, shall present the desired resiliency for absorbing shocks and vibrations produced in traveling over relatively rough roads, to the end that they shall not be transmitted to the axles equipped with the wheels and those parts of the vehicle which are supported on the axles, and which shall, generally, produce, when equipped with a solid rubber tire, the advantages afforded by pneumatic tired wheels, without the generally-recognized disadvantages thereof.

Generally stated, my invention consists in providing a construction of wheel in which the hub, through the medium of springs, is supported from a continuous flexible rim, (as distinguished from a rim divided transversely into separate sections) which, in the operation of the wheel in rolling along the ground, is forcible out of true circular form, whereby the rim, owing to its elasticity, supplements the springs in absorbing the vibrations and shocks to which the wheel is subjected in running over relatively rough roads.

Figure 1:
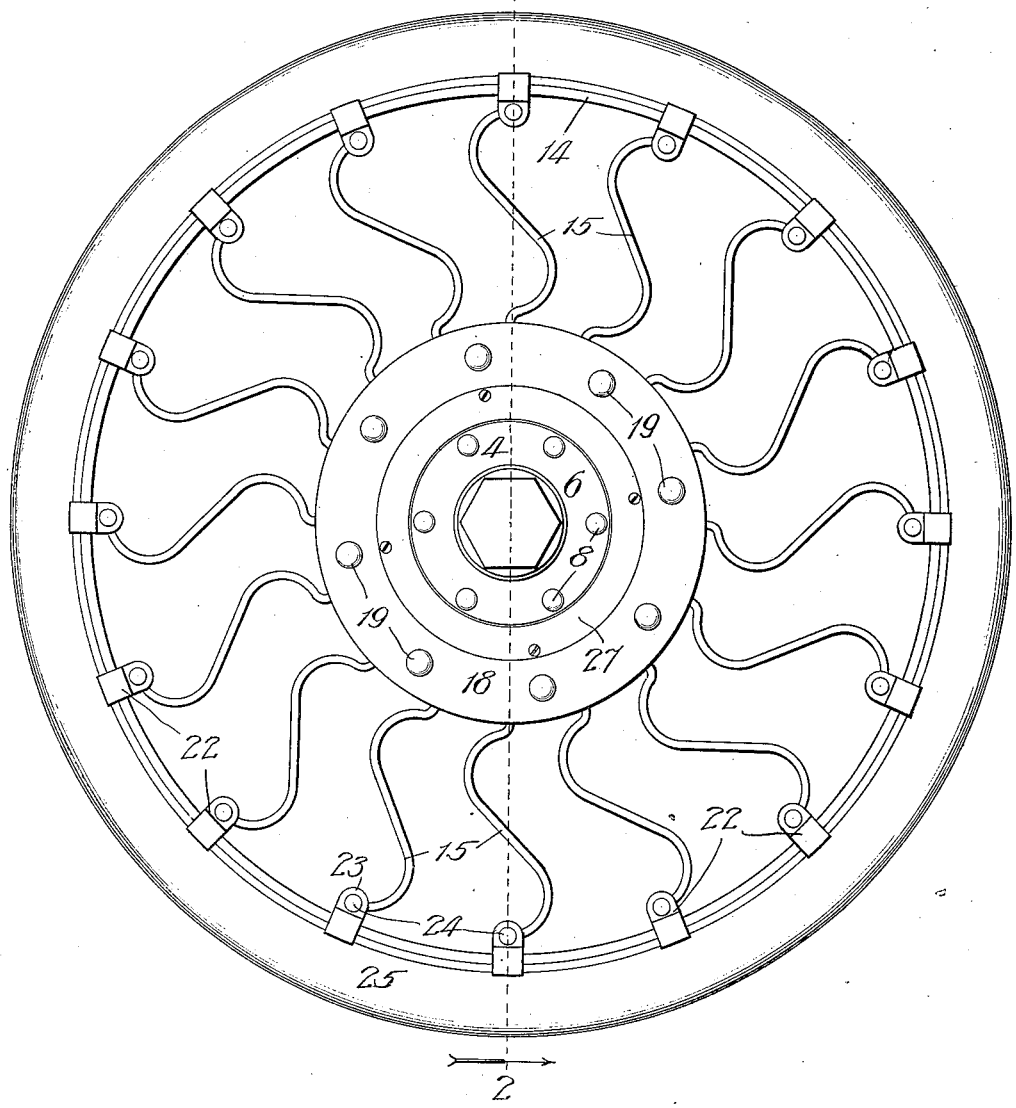
Figure 2:
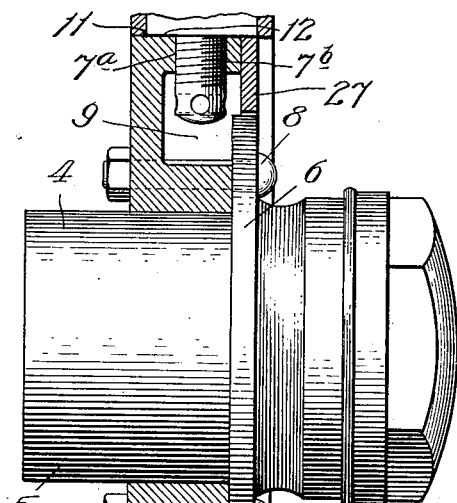
Figure 3:
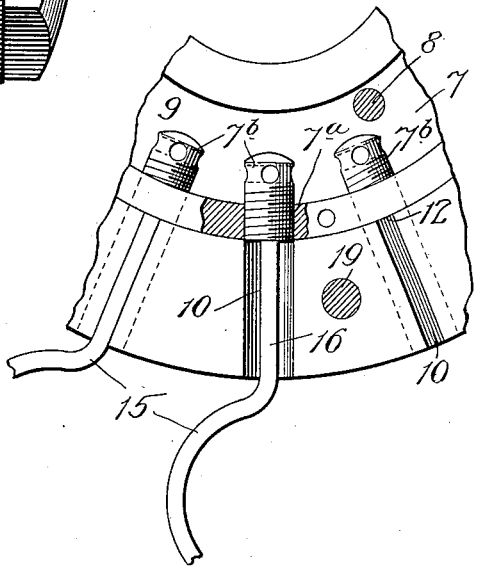

Referring to the accompanying drawings Figure 1 is a view in side elevation of a wheel constructed in accordance with my invention. Fig. 2 is a broken, enlarged, sectional view taken at the line 2 on Fig. 1, and viewed in the direction of the arrow. Fig. 3 is an enlarged broken view of a portion of the hub-section of the wheel with certain parts removed; and Fig. 4, a face view of my improved wheel with certain of the springs omitted, this view showing by full lines, but in somewhat exaggerated condition, the approximate positions assumed by the parts of the wheel when striking an obstacle on the road, and by dotted lines the positions assumed by the rim and springs of the wheel under normal conditions, namely, when the wheel, under a load, is running over smooth roads.

The hub-portion of the wheel comprises a hub-proper 4 of well-known form formed of a cylindrical section 5 and an annular flange 6, and a disk 7 encircling the section 5 and bearing against the inner face of the flange 6, to which latter the disk 7 is secured as by a circular series of bolts 8 passing through this disk and flange. The disk 7 has an annular channel 9 formed in a face thereof and contains radially-extending slots 10 which extend transversely of the disk and open through its periphery, these slots preferably extending short of the channel 9. The outer wall of the channel 9 contains radially-extending threaded openings 7$^a$ which intersect, and extend on opposite sides of the slots 10 as represented in Fig. 3 and into which adjustable set-screws 7$^b$ are screwed. The disk 7 at one face thereof is inset with relation to its body-portion, as represented at 11, from its periphery to the bases 12 of the slots 10, and at its opposite face is offset with relation to its body-portion, as represented at 13, from its outer periphery to the bases 12 of these slots.

The springs for supporting the hub of the wheel upon the rim represented at 14 and which is hereinafter fully described, are represented at 15, these springs in the preferred illustrated embodiment of my invention being in the form of reversely bowed leaf-springs having straight inner sections 16 which fit into the radial slots 10 in the disk 7 and are held in place therein by means of rings 17 and 18 which fit against the opposite faces of the disk 7 at its peripheral margin and against the edges of the springs 15 and are secured in place by bolts 19 which pass through these rings and the disk 7, these rings serving to clamp the springs 15 at their inner ends against displacement.

The rim 14 of the wheel, as I prefer to construct it, is provided about its periphery with a series of dovetailed circumferentially-extending grooves 20, the peripheral surface of the rim being preferably roughened as represented in Fig. 2, for the purpose of enhancing the anchorage thereto of the rubber tire, of the wheel, hereinafter referred to. The rim 14 is connected with the outer ends of the springs 15, which latter are equipped with eyes 21, through the medium of split-clamps 22 which extend on opposite sides of the rim 14 and thus embrace it. The clamps 22 are formed with inwardly-extending opposing lugs 23, between which the eye-equipped ends 21 of the springs 15 extend, bolts, or rivets, 24 extending through the opposing lugs 23 and the spring-eyes 21 serving to clamp the rim 14 to the springs 15.

In the construction illustrated, the tire represented at 25 is of the solid rubber type, its base-portion being preferably formed of a harder and less resilient grade of rubber than is usually employed for tires of this type, the remaining portion of the tire 25 being of rubber possessing the same characteristics as that usually employed in hard-rubber tires. It is preferred that the rim 14 be molded into the tire 25 in the process of manufacturing the latter which would involve the curing and vulcanizing of the tire while associated with the rim 14. Thus treating the tire causes those portions thereof which lie within the dovetailed grooves 20 to become relatively hard and form a firm interlock of the tire with the rim 14, the roughened periphery of the rim serving to augment the anchorage of the tire to it. The curing or vulcanizing of the tire 25 on the rim 14 serves to place the tire under relatively great tension, as in the vulcanizing process there is an appreciable shrinkage of the tire.

The assembling of the parts of the wheel may be performed in the following manner: The set-screws 7$^b$ are first screwed into the openings 7$^a$. The disk 7 is then slipped over the cylindrical section 5 of the hub and secured thereto in the position shown in Fig. 2 by means of the bolts 8. The spring-spokes 15 are then inserted into the slots 10 and the rings 17 and 18 thereupon secured to the disk 7 and against these spokes, as hereinbefore described. The rim 14 of the wheel, with the rubber-tire 25 thereon, is then applied to the outer ends of the spring-spokes 15 to cause it to surround the latter and the clamps 22 thereafter applied to the rim 14 and spokes 15 to the position illustrated in Figs. 1 and 2, and in such position secured by means of the bolts, or rivets, 24, flange-extensions 26 on the clamps, when thus positioned, becoming embedded in the sides of the tire 25. After the parts have been thus assembled, the springs 15 are placed under tension and the wheel trued up by adjusting the set-screws 7$^a$ in the disk 7, the set-screws in being screwed outwardly engaging with the inner ends of the sections 16 of the springs and adjusting them in the grooves 10. After the parts of the wheel have been adjusted as described, the bolts 19 should be finally tightened to firmly grip the sides of the springs 15 at their inner ends, and a ring 27 thereupon applied to the disk 7 to supplement the flange 6 in covering the channel 9.

Figure 4:
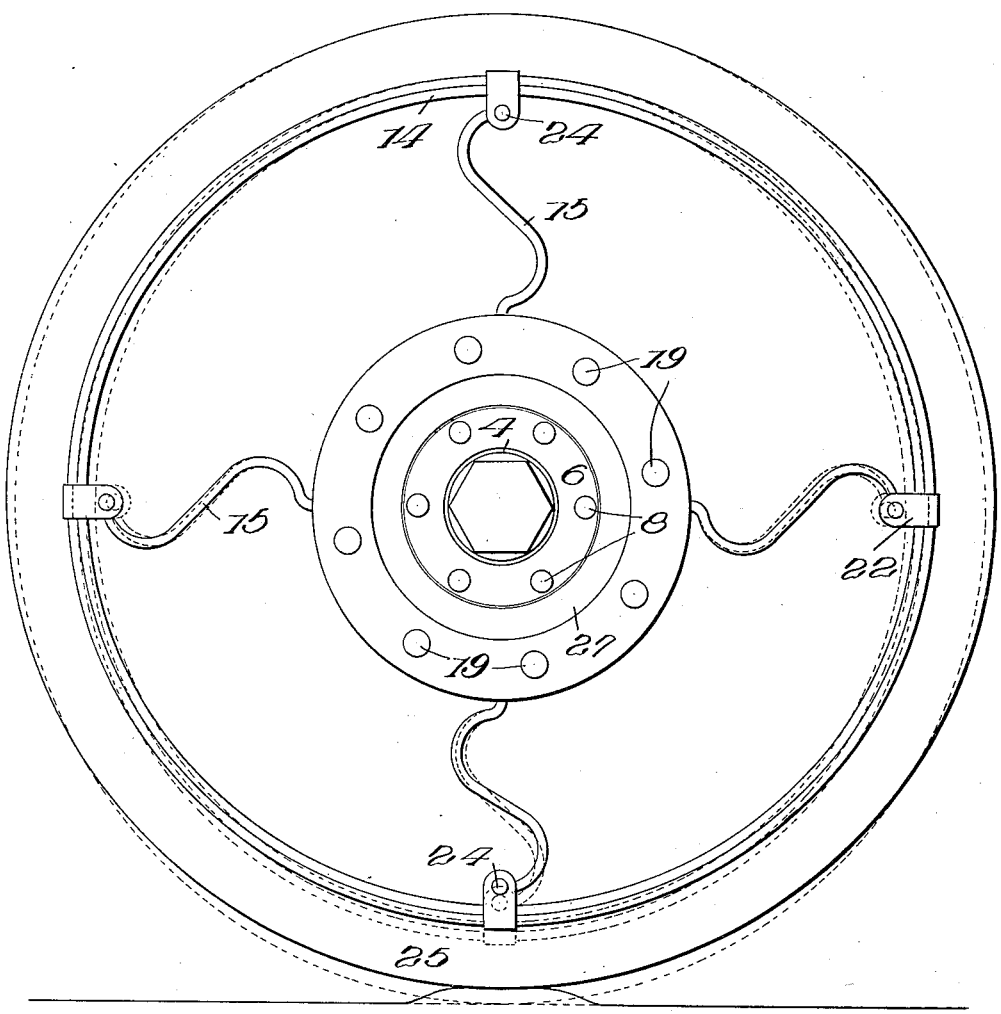

The rim 14 of the wheel is preferably formed of steel of such thickness as to render it flexible under impacts to which it is subjected when the wheel is running over relatively rough roads, and the springs 15 are preferably so tensioned that when the wheel is at rest and is bearing the maximum load intended to be imposed upon it, the wheel will retain true, or substantially true, circular form, as illustrated by dotted lines in Fig. 4. Thus when the wheel in use receives impacts in traveling over relatively rough roads, the rim of the wheel will be forced out of true, or substantially true, circular form into substantially elliptical form as illustrated by the full lines in Fig. 4, the extent of the change in form depending upon the force exerted against the rim by such impact and the extent of initial compression of the springs in assembling them with the other parts of the wheel, and thus the impact against the wheel will be substantially absorbed by the action of the springs 15 and the elasticity of the rim.

The form of rim illustrated is the one which I prefer to employ, but it will be readily understood that any other suitable form of rim may be used and the tire secured thereto in any other suitable manner without departing from the spirit of my invention, provided the rim be a continuous one (as distinguished from a rim transversely divided into sections), and be sufficiently flexible to cause it to spring out of true, or substantially true, circular form into substantially elliptical form when the vehicle with which it is equipped is moving over the ground. It will also be understood that the form of hub and springs and the connections of the latter with the rim and hub may be varied as desired without departing from the spirit of my invention.

It will be manifest from the foregoing description that the removal of a tire from the wheel and the substitution therefor of another may be readily effected by manipulation of the spring-tensioning set-screws and the fasteners for the tire-clamps.

What I claim as new, and desire to secure by Letters Patent, is—

1. A vehicle-wheel comprising a hub, a continuous resilient rim of uniform rectangular cross-sectional area surrounding said hub, and an annular series of springs interposed between, and having their ends rigidly secured to, said rim and hub and set under substantially uniform compression, said springs being so tensioned and said rim being of such stiffness that said rim will be elongated, under impact, at substantially right angles to the point of impact, as distinguished from locally flattening, without such elongation, at the point of impact.

2. A vehicle-wheel comprising a hub, a continuous resilient rim of uniform rectangular cross-sectional area surrounding said hub, and an annular series of radially-extending leaf-springs interposed between, and having their ends rigidly secured to, said rim and hub and set under substantially uniform compression, said springs being so tensioned and said rim being of such stiffness that said rim will be elongated, under impact, at substantially right angles to the point of impact, as distinguished from locally flattening, without such elongation, at the point of impact.

AUGUSTUS F. PRIEST.

In presence of—
JOHN WILSON,
R. A. SCHAEFER.